United States Patent [19]
Abe et al.

[11] Patent Number: 5,949,047
[45] Date of Patent: Sep. 7, 1999

[54] DUST-PROOF PORTABLE IC CARD READER

[75] Inventors: Yuhei Abe; Takashi Azumi, both of Hitachinaka, Japan

[73] Assignee: Hitachi, Ltd., Tokyo, Japan

[21] Appl. No.: 08/916,669

[22] Filed: Aug. 22, 1997

Related U.S. Application Data

[63] Continuation of application No. 08/521,912, Aug. 31, 1995, Pat. No. 5,686,714.

[30] Foreign Application Priority Data

| Sep. 7, 1994 | [JP] | Japan | 6-214010 |
| Sep. 8, 1994 | [JP] | Japan | 6-214821 |
| Sep. 9, 1994 | [JP] | Japan | 6-215585 |
| Oct. 7, 1994 | [JP] | Japan | 6-243669 |

[51] Int. Cl.⁶ .................................................. G06K 9/00
[52] U.S. Cl. ......................... 235/435; 235/441; 235/449
[58] Field of Search ........................... 235/435, 441, 235/444, 449; 312/229; 414/291

[56] References Cited

U.S. PATENT DOCUMENTS

| 4,277,837 | 7/1981 | Stuckert | 235/380 |
| 4,686,357 | 8/1987 | Douno et al. | 235/379 |
| 4,812,632 | 3/1989 | Kakinuma et al. | 235/479 |
| 4,837,422 | 6/1989 | Dethloff et al. | 235/379 |
| 4,865,321 | 9/1989 | Nakagawa et al. | |
| 5,015,830 | 5/1991 | Masuzawa et al. | 235/441 |
| 5,265,951 | 11/1993 | Kumar | 312/223 |
| 5,286,957 | 2/1994 | Defrasne | 235/441 |
| 5,434,395 | 7/1995 | Storck et al. | 235/380 |
| 5,478,996 | 12/1995 | Muto et al. | 235/441 |
| 5,508,501 | 4/1996 | Fujimoto et al. | 235/441 |

FOREIGN PATENT DOCUMENTS

| 0307692 | 3/1989 | European Pat. Off. | 235/441 |
| 0576338 | 12/1993 | European Pat. Off. | 235/441 |
| 4181394 | 6/1992 | Japan . | |
| 6176207 | 6/1994 | Japan | 235/441 |
| 6176208 | 6/1994 | Japan | 235/441 |

*Primary Examiner*—Donald Hajec
*Assistant Examiner*—Mark Tremblay
*Attorney, Agent, or Firm*—Antonelli, Terry, Stout & Kraus, LLP

[57] ABSTRACT

A potable IC card reader for retrieving information from an IC card incorporating a semiconductor memory device and displaying at least part of retrieved information, the portable IC card reader being portable in a clothes pocket, a bag or the like, comprising a housing having a display portion provided on a part of the housing for displaying the at least part of retrieved information and incorporating a controller, the housing further having, at least at a part of the surface thereof, an IC card insert port through which the IC card is inserted and an IC card accommodating unit extending straight from the IC card insert port to the opposite side thereof, the housing still further having a foreign-matter ejection exit formed by extending the IC card accommodating unit and opening at the opposite side of the integrated-circuit card insert port. The foreign matters are ejected from the IC card accommodating unit by insertion of the IC card, preventing the IC card reader from malfunctioning that may be caused by the foreign matters.

9 Claims, 9 Drawing Sheets

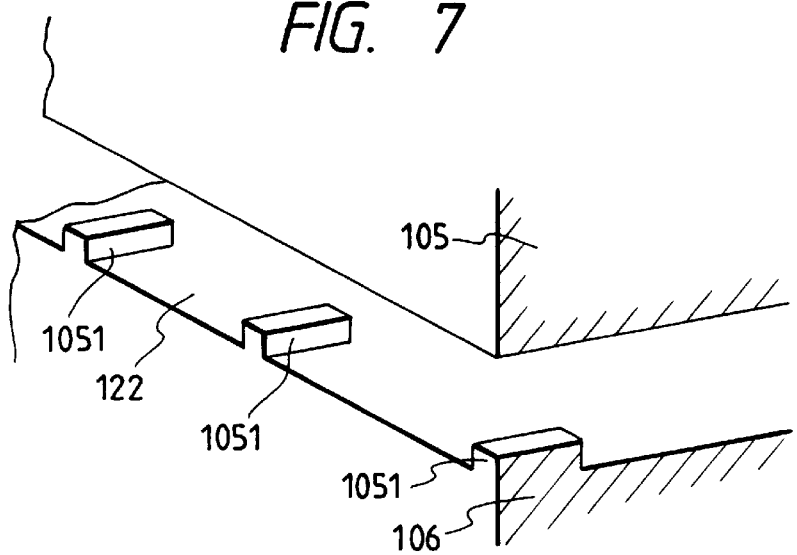
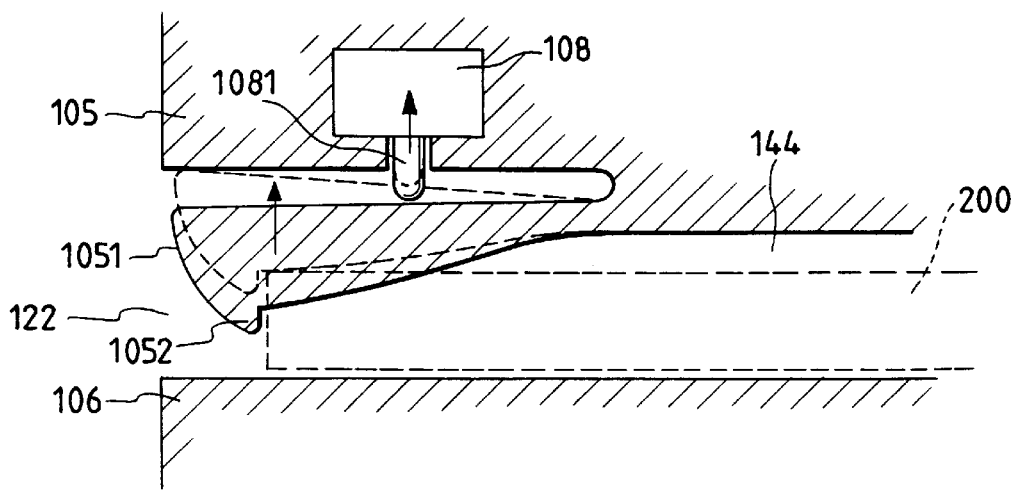

DUST-PROOF PORTABLE IC CARD READER

This application is a continuation of application Ser. No. 08/521,912, filed Aug. 31, 1995. now U.S. Pat. No. 5,686,714

BACKGROUND OF THE INVENTION

1. Field of the Invention

The present invention relates to an IC (Integrated Circuit) card reader for reading and displaying the contents of an IC card and more particularly, to a portable IC card reader carried about in a clothes pocket, a bag or the like.

2. Description of the Related Art

Disclosed in U.S. Pat. No. 5,265,951 for example is an electronic terminal device (an IC card reader) for retrieving information from an IC card used as an information storage medium and displaying the retrieved information with the device's input port being shielded electromagnetically. In the disclosed technique, the IC card insert port through which an IC card is inserted is arranged with a dust-proof lid. Namely, with the IC card reader having such a construction, the lid is opened only when an IC card is inserted and kept closed when no IC card is inserted.

This setup prevents the IC card reader from malfunction or undue deterioration due to foreign matters such as dust entered through the card insert port.

In the above-mentioned conventional construction, the lid provided at the IC card insert port makes it difficult for foreign matters from penetrating the IC card reader. However, it is still possible for very minute foreign manners to penetrate the IC card reader little by little through a gap at the IC card insert port or the like. In normal use, the minute foreign matters that entered the IC card reader accumulate there. The accumulated foreign matters contaminate electrical contacts of an inserted IC card to adversely affect its inner electronic circuit as well as the electronic circuit of the IC card reader.

If the conventional IC card reader is carried in a clothes pocket or a bag, foreign matters that may penetrate the IC card reader include not only dust and grit that cause an electrical damage relatively seldom but also a metal clip or the like that may short-circuit the IC card reader and a adhesive material that sticks to the inner wall of the IC card reader to cause some mechanical trouble. For example, if a foreign-matter sticks to any of the contact electrodes that get information from the inserted and electrically contacted IC card, a poor contact may occur between the contaminated contact electrode and a corresponding mating contact, thereby making it impossible to get information from the IC card or getting wrong information.

Especially, if wrong information is retrieved from an IC card when displaying the bank deposit balance or the ID number for example, a serious problem may be entailed for the user of the IC card. Therefore, popularization of the use of IC cards requires the IC card reader to be constructed such that it is difficult for foreign matters to penetrate to reduce chances of foreign-matter induced erroneous operations, thereby significantly enhancing the reliability of the IC card reader.

However, the conventional IC card readers have no measures in dust-proof and construction against the foreign-matter penetration especially which work when the IC card reader is carried inside a clothes pocket or a bag.

SUMMARY OF THE INVENTION

It is therefore an object of the present invention to provide a portable, highly reliable IC card reader having a dust-proof construction that prevents the penetration of foreign-matter especially when the IC card reader is carried about in a clothes pocket, a bag or the like.

It is another object of the present invention to provide a highly reliable IC card reader constituted to automatically ejects foreign-matter from inside an IC card accommodating unit in the IC card reader by the action of inserting an IC card.

It is still another object of the present invention to provide a highly reliable IC card reader constituted to automatically clean an IC card accommodating unit by the action of inserting the IC card.

In carrying out the invention and according to one aspect thereof, there is provided a potable IC card reader for retrieving information from an IC card incorporating a semiconductor memory device and displaying at least part of retrieved information, the portable IC card reader being portable in a clothes pocket, a bag or the like, comprising: a housing having a display portion provided on a part of the housing for displaying the at least part of retrieved information and incorporating a controller, the housing further having, at least at a part of the surface thereof, an IC card insert port through which the IC card is inserted and an IC card accommodating unit extending straight from the IC card insert port to the opposite side thereof, the housing still further having and a foreign-matter ejection opening formed by extending the IC card accommodating unit and opening at the opposite side of the IC card insert port.

In carrying out the invention and according to another aspect thereof, there is provided a portable IC card reader for retrieving information from an IC card incorporating a semiconductor memory device and displaying at least part of retrieved information, the portable IC card reader being portable in a clothes pocket, a bag or the like, comprising: a housing having a display portion provided on a part of the housing for displaying the at least part of retrieved information and incorporating a controller, the housing further having, at least at a part of the surface thereof, an IC card insert port through which the IC card is inserted and an IC card accommodating unit extending straight from the IC card insert port to the opposite side thereof, the housing still further having a foreign-matter ejection member for ejecting foreign matters from the IC card accommodating unit by insertion of the IC card.

In carrying out the invention and according to still another aspect thereof, there is provided a portable IC card reader for retrieving information from an IC card incorporating a semiconductor memory device and displaying at least part of retrieved information, the portable IC card reader being portable in a clothes pocket, a bag or the like, comprising: a housing having a display portion provided on a part of the housing for displaying the at least part of retrieved information and incorporating a controller, the housing further having, at least at a part of the surface thereof, an IC card insert port through which the IC card is inserted and an IC card accommodating unit extending straight from the IC card insert port to the opposite side thereof, the housing still further having a cleaning member for cleaning the inside of the IC card accommodating unit by insertion of the IC card.

In carrying out the invention and according to yet another aspect thereof, there is provided a portable IC card reader for displaying data stored in an IC card, comprising: a space in which an IC card is loaded, the space having a first opening through which the IC card is inserted and a second opening connecting to the first opening.

In carrying out the invention and according to a separate aspect thereof, there is provided a portable IC card reader for displaying data stored in an IC card, comprising: a space in which the IC card is loaded, the space having a first opening through which the IC card is inserted and a second opening connecting to the first opening, the first opening having a lid member slidable inside, the lid member being slid inside by insertion of the IC card to clean the inside of the space, the lid member being moved up to a proximity of the second opening.

According to the portable IC card reader provided by the present invention, foreign matters that penetrated in the IC card accommodating unit during carrying of the IC card in a clothes pocket, a bag or the like are collected and ejected outside the IC card accommodating unit by insertion of the IC card or the inside of the IC card accommodating unit is cleaned. This novel setup ensures good contact between the contact electrodes of the IC card and the contact electrodes of the IC card accommodating unit, thereby realizing the easy-to-carry, highly reliable IC card reader.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 7 is a partially enlarged perspective view illustrating a variation of a construction of an IC card accommodating unit of the portable IC card reader of FIG. 1;

FIG. 8 is a cross sectional view of a variation of the constitution of the edge sensing switch of FIG. 4;

DESCRIPTION OF THE PREFERRED EMBODIMENTS

This invention will be described in further detail by way of example with reference to the accompanying drawings.

Figure 1:
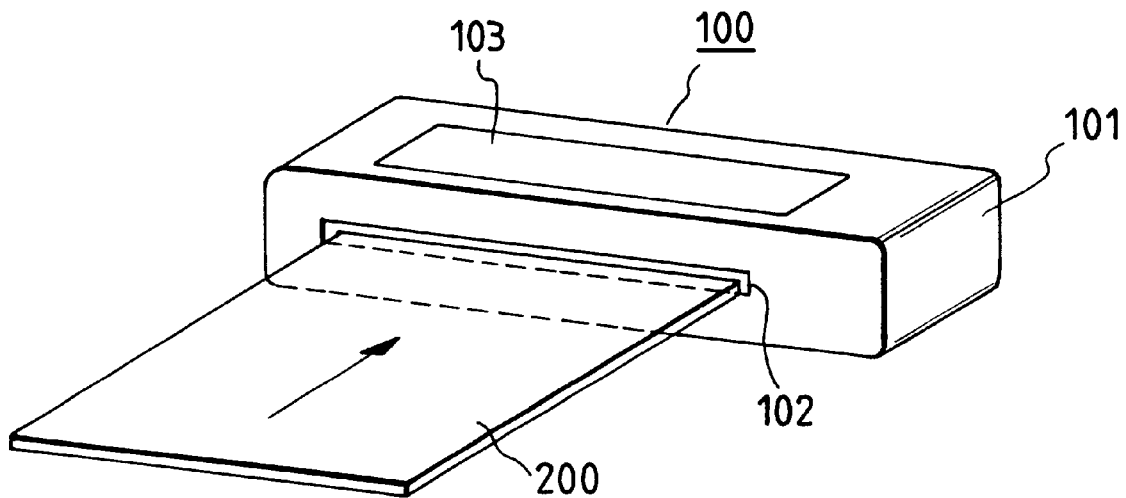
FIG. 1 is a perspective diagram illustrating a first preferred embodiment of a portable IC card reader according to the invention, the IC card reader being in use.

Now, referring to FIG. 1, there is shown a perspective view of a portable IC card reader 100 practiced as a first preferred embodiment of the invention. Reference numeral 101 indicates an IC card reader housing molded from plastic for example. Reference numeral 102 indicates an IC card insert port formed along one of the longitudinal sides of the housing. FIG. 1 shows a state in which an IC card 200 incorporating a semiconductor memory is inserted in the IC card insert port 102, the semiconductor memory being capable of holding information without a backup power.

The IC card will be described in detail later. It should be noted that an IC card accommodating unit 104 (FIG. 2) to be described later extends from the insert port 102 through the housing 101 to the opposite end.

Reference numeral 103 indicates an IC card reader display device which is preferably formed with a liquid crystal display (LCD). In addition, the IC card reader 100 incorporates a controller (FIG. 5) including a microcomputer and other devices in the form of a control IC.

Figure 2:
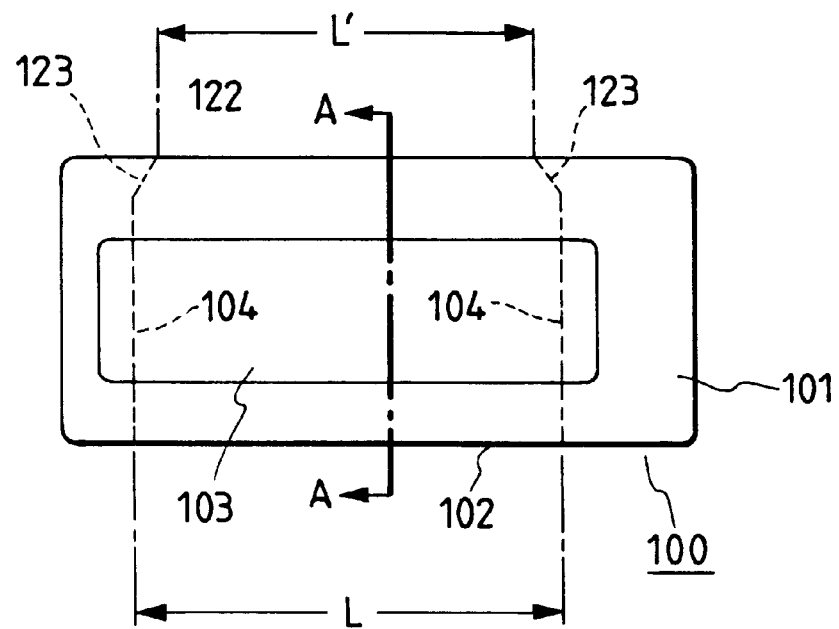
FIG. 2 is a top view of the portable IC card reader of FIG. 1.

Referring to FIG. 2, there is shown a top view of the IC card reader 100, especially showing the relationship between the external view of the IC card reader 100 and the IC card accommodating unit 104. Namely, in the figure, the inner walls of the IC card accommodating unit 104 are indicated by dashed lines and the width of the IC card insert port 102 is indicated by L. The inner walls of the IC card accommodating unit 104 extend to the opposite side of the IC card insert port 102 to open at that side as a second opening 122 (or foreign-matter ejection exit). The IC card accommodating unit 104 is formed with abutting portions 123 at the respective inner walls. The abutting portions 123 are arranged to change the width of the IC card accommodating unit 104 at the second opening 122. To be specific, the inner walls project toward the center of the IC card accommodating unit 104 until a second width L' is formed. The relationship between L and L' is L>L'.

Figure 3:
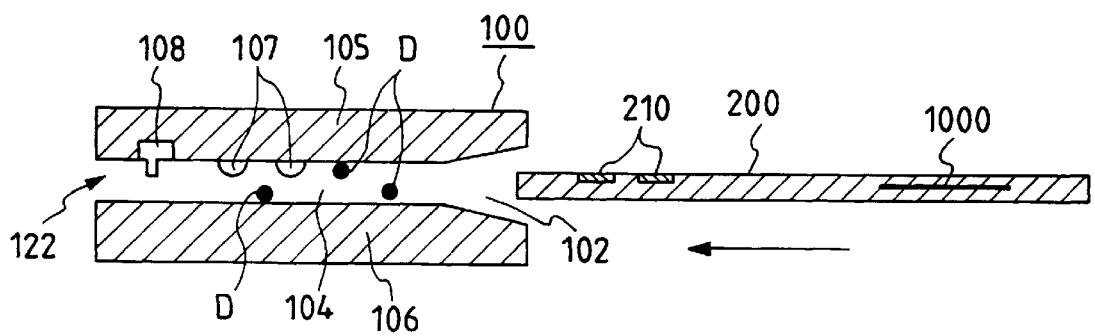
FIG. 3 is a cross sectional view of the IC card reader of FIG. 2 along a dot-and-dash line A—A.

Referring to FIG. 3, there is shown a cross section of the IC card reader 100 along A—A of FIG. 2 with no IC card inserted. In FIG. 3, reference numeral 105 indicates an upper member of the IC card reader housing 101 while reference numeral 106 indicates a lower member thereof. Reference numeral 107 indicates a plurality of contact electrodes 107 mounted inside the IC card accommodating unit 1404 of the IC card reader 100. To be specific, the plurality of contact electrodes 107 are mounted on the upper member 105 at the underside thereof. As seen from FIG. 4, the plurality of contact electrodes 107 are arranged such that they come contact with a plurality of contact electrodes 210 provided on one side of an IC card 200 inserted in the IC card accommodating unit 104 of the IC card reader 100. Reference numeral 108 indicates an edge sensing switch for sensing the leading edge of the inserted IC card 200. Like the contact electrodes 107, the sensing switch 108 is also mounted on the upper member 105 at the underside thereof at the end opposite to the IC card insert port 102. The sensing switch 108 may also serve as a block for preventing the IC card 200 from being inserted from the foreign-matter ejection exit 122 provided at the opposite side of the IC card insert port 102.

The IC card accommodating unit 104 formed from the insert port 102 of the housing 101 toward the inside thereof tapers until the height of the accommodating unit 104 gets slightly larger than the thickness of the IC card 200 and then runs toward the opposite side, maintaining the same height. It will be apparent that such a construction of the IC card accommodating unit 104 facilitates the insertion of the IC card 200 from the insert port 102. The tapering may be curved out. FIG. 3 also shows foreign matters D attached to the inner walls of the IC card accommodating unit 104.

Figure 4:
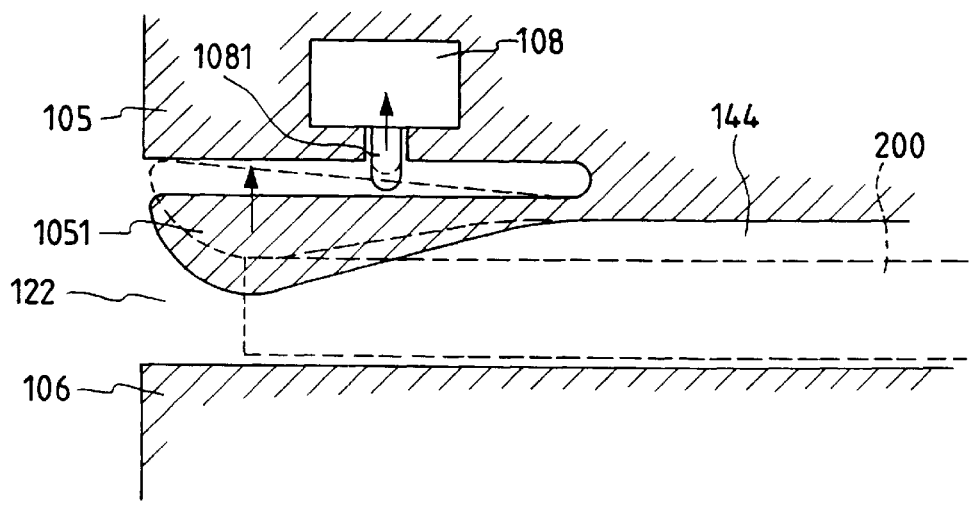
FIG. 4 is an enlarged cross sectional view of an edge sensing switch of the portable IC card reader of FIG. 1.

Referring to FIG. 4, there is shown a detail construction of the edge sensing switch 108 for sensing the leading edge of the inserted IC card 200. As apparent from FIG. 4, the upper member 105 of the housing 101 is partially formed into a movable reed-like portion 1051 which gets thicker toward the free end thereof, the cross section being generally triangular. Hence, when the IC card 200 is inserted, the reed-like movable portion 1051 is pressed up as indicated with dashed lines to push a movable bar of the edge sensing switch 108, thereby closing a switch incorporated in the edge sensing switch 108. Thus, the edge sensing switch 108 senses that the IC card 200 has been set in place in the IC card accommodating unit 104.

Figure 5:
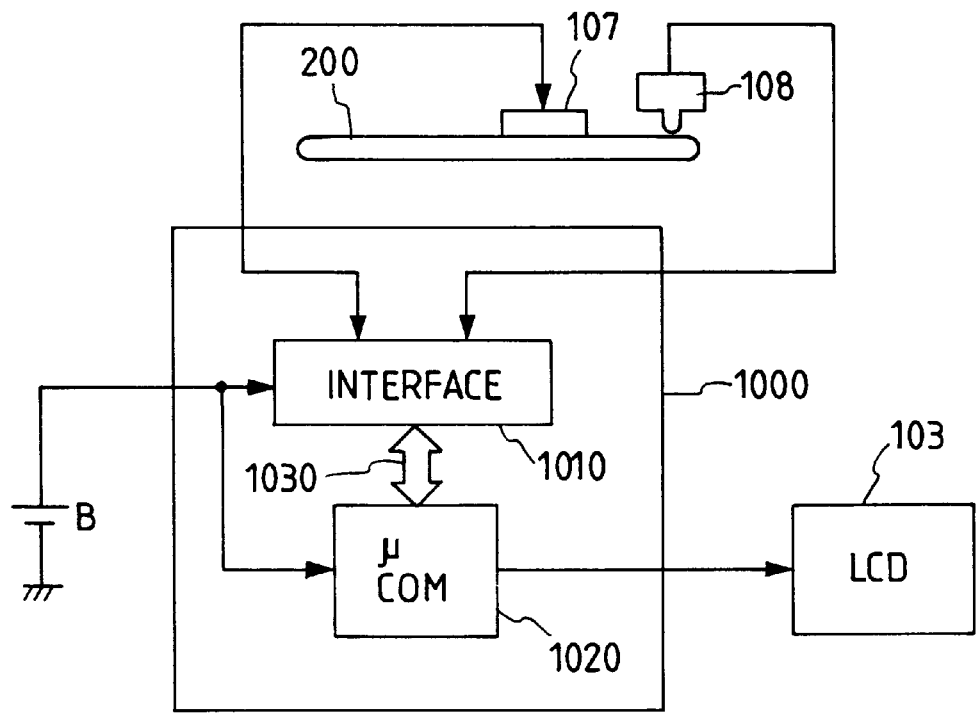
FIG. 5 is a block diagram illustrating a circuit constitution of a control IC and associated portions incorporated in the portable IC card reader of FIG. 1.

Referring to FIG. 5, there is shown a block diagram illustrating a control IC 1000 constituting a controller accommodated in the housing 101 of the IC card reader 100, and peripheral circuits of the control IC 1000. The control IC 1000 includes an interface circuit 1010 and a microcomputer 1020 incorporating a memory. A bus line 1030 connects the interface circuit 1010 and the microcomputer 1020. The microcomputer 1020 sends its output to the liquid crystal display (LCD) that constitutes the IC card reader display device 103. The interface circuit 1010 is connected with the plurality of contact electrodes 107 that come in electrical contact with the plurality of contact electrodes 210 provided on the IC card 200. In addition, the interface circuit 1010 is connected with the edge sensing switch 108 of which detail construction is shown in FIG. 4. Reference symbol B in FIG. 5 indicates a battery from which a power voltage is applied to the microcomputer 1020 and, via the interface circuit 1010, to the IC card 200. It should be noted that the interface circuit 1010 may have a voltage converter, in the case of which the necessity of voltage conversion may be determined by the microcomputer 1020.

The IC card 200 may also incorporate a power supply such as a battery (a button-shaped battery) or a solar battery, in the case which a memory of a type that retains information by the backup power may be used for an electronic memory device to be incorporated in the IC card.

Figure 6:
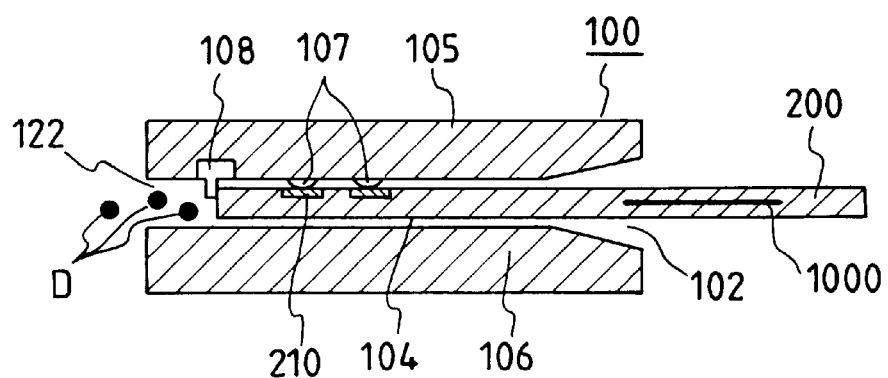
FIG. 6 is a cross sectional view illustrating a foreign-matter ejecting action in the portable IC card reader of FIG. 1.

The following describes operations of the above-mentioned IC card reader 100 with reference to FIG. 6 in addition to the above-mentioned figures. First, in FIGS. 1 and 3, when the IC card 200 is inserted in the IC card insert port 102 in the direction of the arrow until stopped by the abutting portions 123 (tapering inner walls) of the foreign-matter ejection exit 122 having the width L', the IC card 200 is fixed in place in the IC card accommodating unit 104. In this state, as shown in FIG. 6, the plurality of contact electrodes 210 provided on one side of the IC card 200 are in contact with the plurality of contact electrodes 107 provided inside the IC card accommodating unit 104. At the same time, the leading edge of the IC card 200 presses up the reed-like movable portion 1051 in the direction of the arrow as shown in FIG. 4, thereby activating (closing) the edge sensing switch 108. Thus, it is detected that the IC card 200 has been inserted up to the predetermined position in the IC card reader 100. To be specific, as shown in FIG. 5, a sensing output of the edge sensing switch 108 is put in the microcomputer 1020 via the interface circuit 1010, thereby starting the operation of the IC card reader 100. For example, the IC card reader 100 supplies a predetermined power to the IC memory in the inserted IC card 200, reads information from the IC memory in the IC card 200 or writes information to the IC memory as required, and displays the information on the display device 103 mounted on the IC card reader 100. The information stored in the IC memory in the IC card 200 or displayed on the display device 103 includes an ID number and a balance of deposit for example.

It should be noted that the foreign matters D attached to the inside of the IC card accommodating unit 104 are pushed by the leading edge of the inserted IC card 200 out of the foreign-matter ejection exit 122 provided at the opposite side of the IC card insert port 102 as shown in FIG. 6. Namely, according to the construction of the IC card reader 100 of the present invention, in particular, the construction of the IC card accommodating unit of the present invention, the IC card 200 is inserted in the IC card accommodating unit 104 of the IC card reader 100 to read and display information from the IC card 100 for checking the contents of the IC card 200 and, at the same time, remove the foreign matters out of the IC card accommodating unit 104, the foreign matters imposing a risk of causing the IC card reader 100 and/or the IC card 200 to malfunction. Therefore, the foreign matters that has penetrated the IC card accommodating unit 104 while the IC card reader 100 was carried out in a clothes pocket, a bag or the like are automatically cleaned for reliable checking of the storage contents of the IC card 200. As described, the construction of the IC card reader practiced as the above-mentioned embodiment is very simple and therefore finds suitable application especially in a low-cost IC card readers.

Referring to FIG. 2, the IC card accommodating unit 104 has the abutting portions 123 that prevents the IC card 200 from advancing any further when fully inserted because the abutting portions 123 narrow the IC card accommodating unit 104 by the width L'. In the above-mentioned embodiment, the IC card accommodating unit 104 tapers toward the second opening 122. It will be apparent that the IC card accommodating unit 104 may also get narrow rather abruptly than in tapering manner to prevent the IC card 200 from advancing further. Alternatively, to attain the same effect, a plurality of generally prism-shaped blocks 1051 may be arranged on the lower member 105 constituting the IC card accommodating unit 104 in the housing 101 at the opposite end of the IC card insert port as shown in FIG. 7.

Further, the above-mentioned embodiment may be constituted such that the width L of the IC card accommodating unit 104 is kept unchanged by using the constitution of activating the edge sensing switch 108 shown in FIG. 4. Namely, the reed-like movable portion 1051 on the upper member 105 of the housing 101 may be formed with a downward step 1052 as shown in FIG. 8 to define the stop position of the inserted IC card 200. Still further, as apparent from FIG. 8, the tilt angle of the reed-like movable portion 1051 may be made relatively large at the side of the foreign-matter ejection exit 122 and formed with the above-mentioned downward step 1052, to prevent the IC card 200 from being erroneously inserted from the foreign-matter ejection exit 122.

Figure 9:
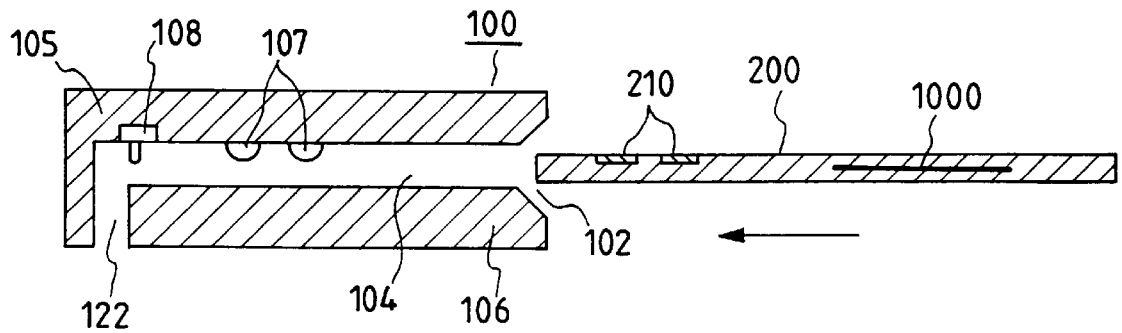
FIG. 9 is a cross sectional view illustrating a variation of a foreign-matter ejecting exit of the portable IC card reader of FIG. 3.

Referring to FIG. 9, there is shown another variation to the above-mentioned embodiment. Namely, as apparent from FIG. 9, the second port 122 serving as the foreign-matter ejection exit extends downward at the opposite end of the IC card insert port 102. As a result, the foreign matters attached in the IC card accommodating unit 104 are collected near the second opening 122 by the leading edge of the IC card 200 to be dropped out down outside the housing 101.

Figure 11:
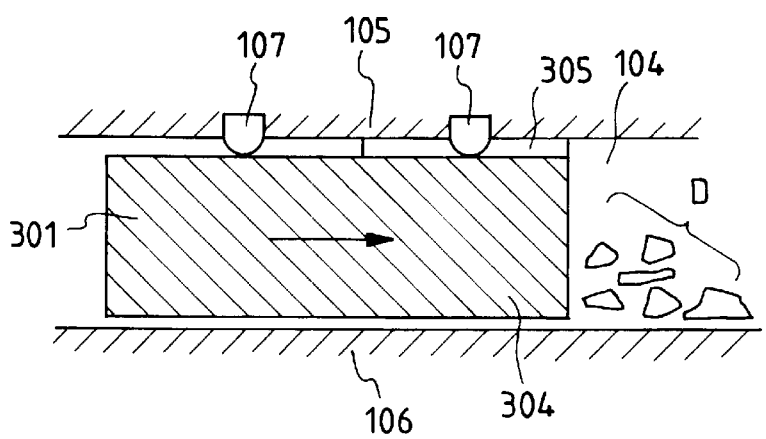
FIG. 11 is a partially enlarged cross sectional view illustrating a cleaning action of the portable IC card reader of FIG. 10.
Figure 10:
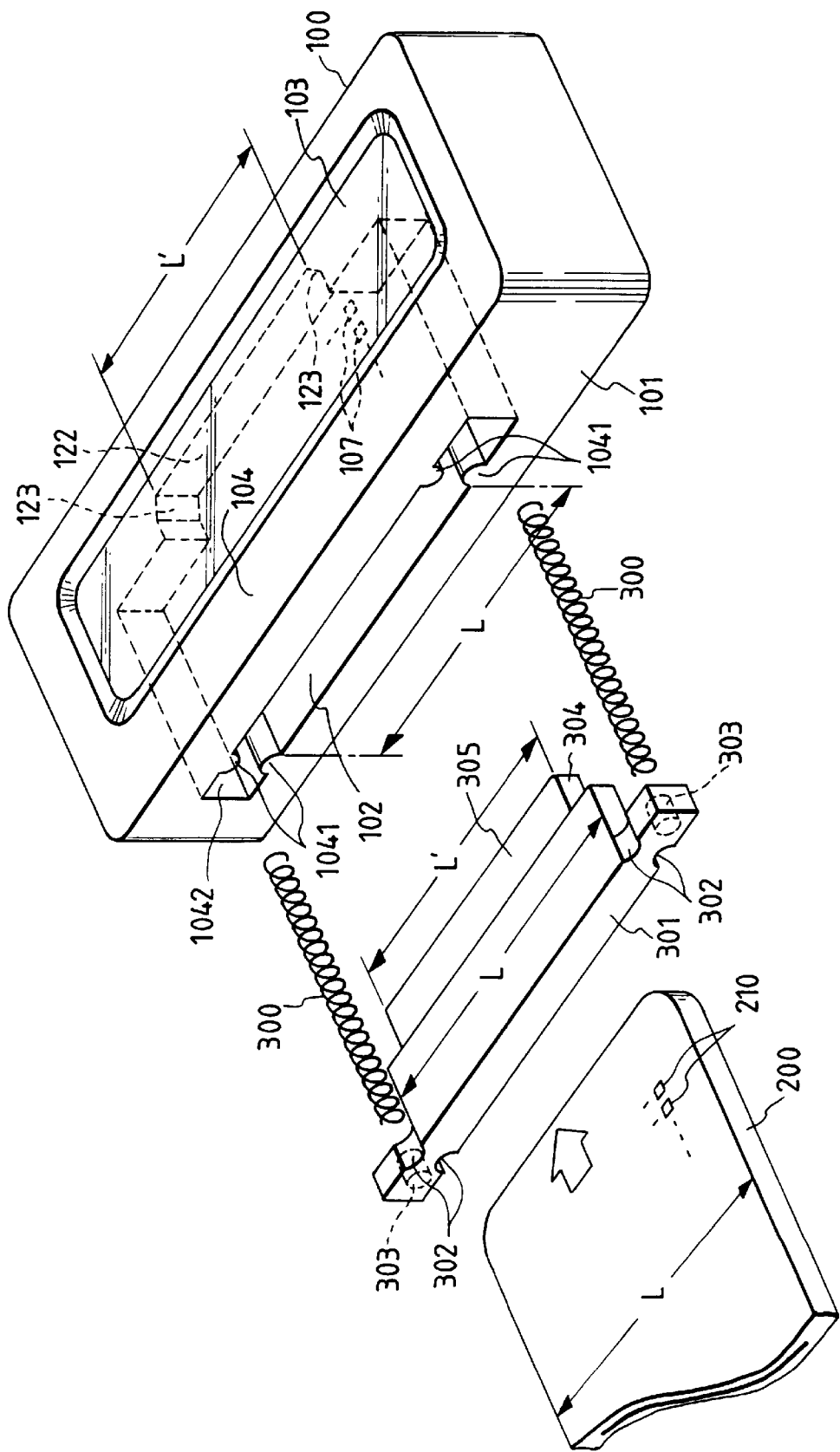
FIG. 10 is an exploded perspective diagram illustrating a second preferred embodiment of a portable IC card reader according to the present invention.
Figure 12:
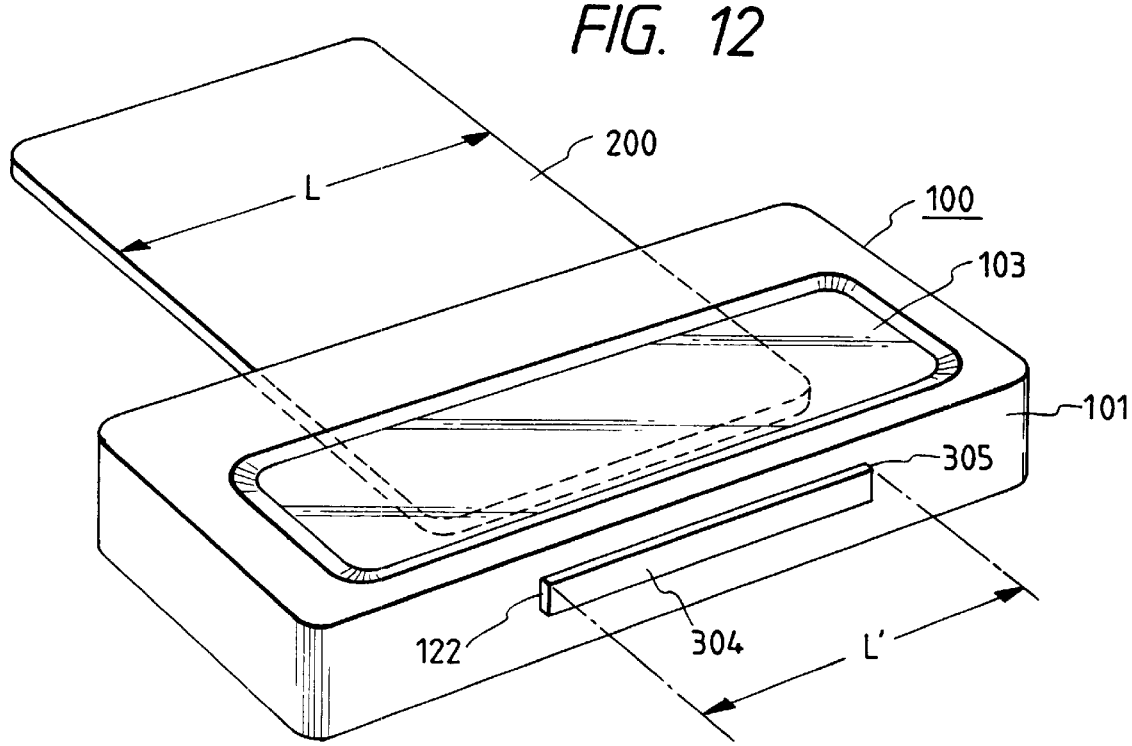
FIG. 12 is a perspective view illustrating the portable IC card reader of FIG. 10 with an IC card inserted.

Referring to FIGS. 10 through 12, there is shown a portable IC card reader practiced as a second preferred embodiment of the invention. With reference to FIGS. 10 through 12, components similar to those previously described with FIGS. 1 through 9 are denoted by the same reference numerals. In the second embodiment, a second opening serving as a foreign-matter ejection exit generally similar to the above-mentioned second opening is provided and a member for preventing penetration of foreign matters is arranged at an IC card insert port 102 of an IC card reader 100.

As apparent from FIG. 101 in the second embodiment, an IC card accommodating unit 104 extending from the IC card insert port 102, which is formed along the width of a plastic housing 101, to the opposite side of the IC card insert port 102 through the housing 101, has pairs of projections 1041 on both sides, one of the projections 1041 having generally a "U" shape, the other having generally an upside-down "U" shape. The pairs of projections 1041 form accommodating recesses 1042 in each of which a coil spring 300 is inserted. A first lid member 301 is provided to prevent foreign matters from penetrating the IC card accommodating unit 104 from the IC card insert port 102. The first lid member 301 is inserted in the IC card insert port 102 and the accommodating recesses 1042 on both sides thereof to be slid back and forth in the IC card accommodating unit 104. The lid member 301 is generally the same, in cross section, with the IC card insert port 102 including the accommodating recesses 1042 on both ends thereof (namely, the lid member 301 has generally "U"-shaped notches 302 so as to be fit in the IC card insert port 102 and the accommodating recesses 1042). In addition, the lid member 301 is formed, at both ends thereof, with dents 303 each for receiving one of the coil spring 300. Further, the lid member 301 is formed a center projection 304 at the center thereof and on the side of a foreign-matter ejection exit 122. The center projection 304 has a cleaning member 305 attached to on the top surface thereof, the cleaning member 305 being made of felt, cloth or the like. For the cleaning member 305, flexible materials such as paper and bonded fabric for example may also be used. When assembling the IC card reader 100, the coil springs 300 are inserted in the accommodating recesses 1042, the first lid member 301 is inserted in the IC card accommodating unit 104 formed in the housing 101, and the first lid member 301 is prevented from getting out of the housing by means of a member not shown.

In the IC card reader 100 practiced as the second preferred embodiment of the invention, when the IC card 200 is inserted at the IC lid insert port 102, the first lid member 301 is pressed back against the bounce of the coil springs 300. The first lid member 301 is stopped when the IC card 200 is inserted in place. The first lid member 301 is stopped by a mechanism generally similar to that of the first embodiment. Namely, the first lid member 301 having the width L is abutted at both shoulders thereof against abutting portions 123 provided on both ends of the foreign-matter ejection exit 122, the abutting portions 123 defining the width L' of the foreign-matter ejection exit 122. It should be noted that, during the insertion, the projections 1041 in which the notches 302 of the first lid member 301 are mating serve as a guide rail.

Referring to FIG. 11, when the first lid member 310 is pressed back in the IC card accommodating unit 104, the leading edge of the first lid member 310 pushes foreign matters D out of the housing 101 and, at the same time, the cleaning member 305 made of felt for example attached on the upper surface of the first lid member 301 cleans the under surface of the upper member 105 of the housing 101. This setup sufficiently removes the foreign matters including generally adhesive foreign matters and microscopic foreign matters from the inner walls of the IC card accommodating unit 104. Especially, this cleaning setup cleans the contact surface of the contact electrodes 107 mounted on the under surface of the upper member 105 of the housing 101 to ensure good electrical contact with the contact electrodes 210 of the IC card 200. Referring to FIG. 12, the center projection 304 of the first lid member 301 pushing the foreign matters D out projects slightly from the foreign-matter ejection exit 122 provided on the opposite side of the IC card insert port 102, thereby fully ejecting the foreign matters out of the IC card accommodating unit 104.

Figure 13:
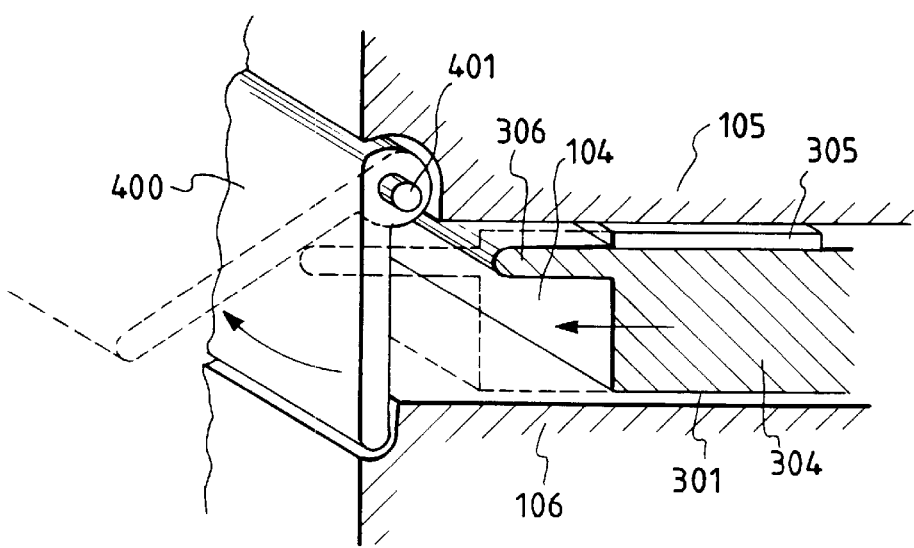
FIG. 13 is a partially enlarged perspective view illustrating a variation of the portable IC card reader of FIG. 10.

Referring to FIG. 13, there is shown a variation to the IC card reader 100 practiced as the second preferred embodiment. In this variation, a second lid member 400 is provided at the foreign-matter ejection exit 122 of the IC card reader 100 to prevent the penetration of foreign matters into the IC card accommodating unit 104 from the foreign-matter ejection exit 122. The second lid member 400 is formed with a plastic plate for example and has axial projections 401 on both sides to be mated in openings, not shown, in opposite walls constituting the foreign-matter ejection exits 122, thereby allowing the second lid member 400 to be attached to the upper member 105 in a swinging manner. It will be apparent that the second lid member 400 is constituted so as to normally close the foreign-matter ejection exit 122 by means of an elastic body such as a spring.

As apparent from FIG. 13, the first lid member 301 that slides in the IC card accommodating unit 104 has a projection 306 at the leading edge thereof for opening the second lid member 400 when the first lid member 301, or the IC card 200 has been inserted to a predetermined position. Thus, according to the variation of FIG. 13, the second lid member 400 prevents foreign matters from penetrating the IC card accommodating unit 104 from the foreign-matter ejection exit 122 of the IC card reader 100 and, at the same time, is pushed open when the IC card 200 has been inserted in place to eject the foreign matters out of the IC card accommodating unit 104.

Figure 14:
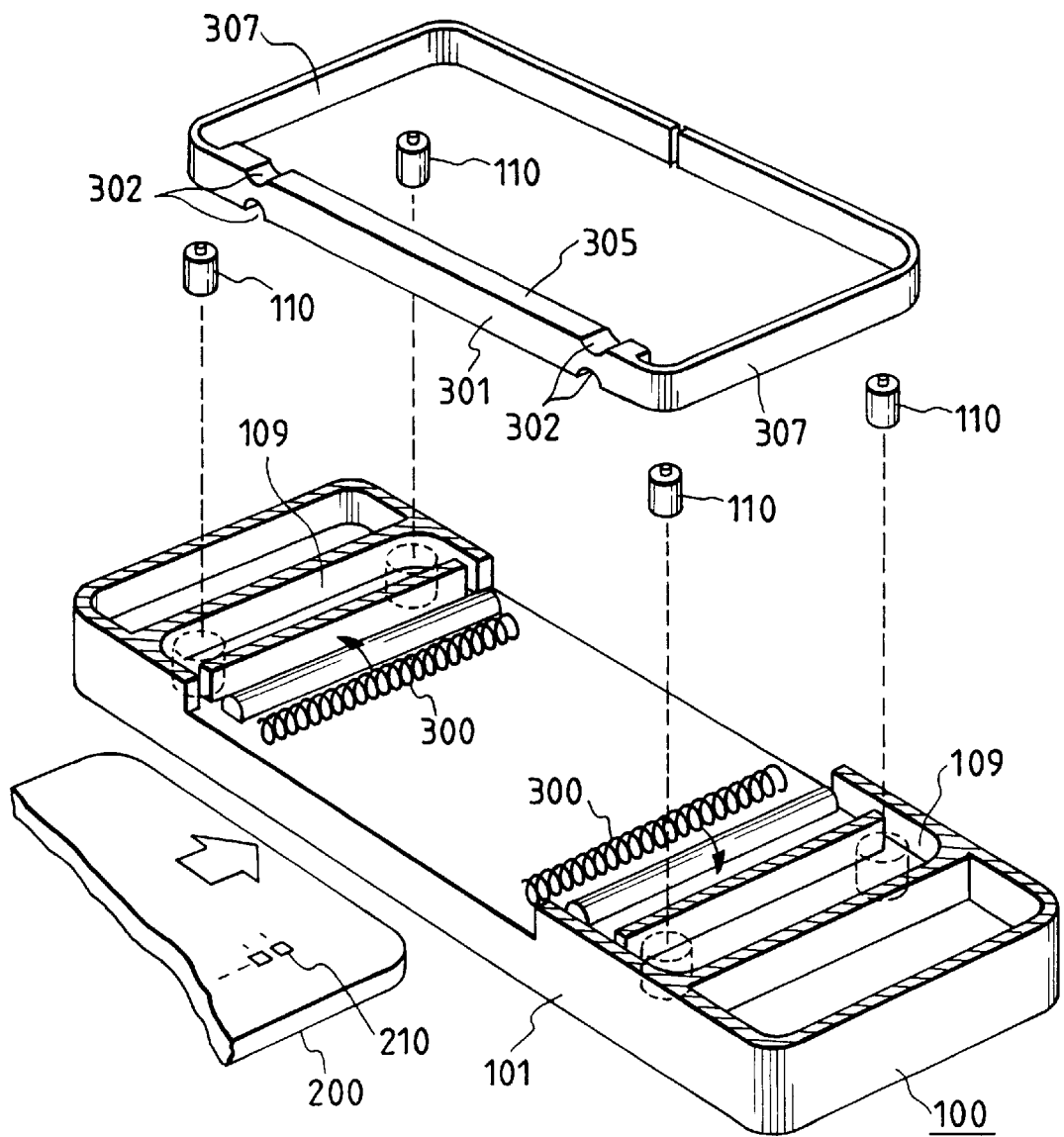
FIG. 14 is an exploded perspective view illustrating a detail constitution of a third preferred embodiment of a portable IC card reader according to the present invention.

Referring to FIG. 14, there is an IC card reader practiced as a third preferred embodiment of the invention. In this embodiment, a shield member that opens and closes while sliding is provided at the foreign-matter ejection exit 122 of the IC card reader 100. In this IC card reader 100, the first lid member 301 is attached with shield members 307 on both sides, each of the shield members 307 being formed by a thin elastic material such as vinyl chloride that returns to its original shape without leaving trace of bending. The housing 101 of the IC card reader 100 is internally formed with guide grooves 109 for slidably guiding the shield members 307. As apparent from FIG. 14, the guide grooves 109 are curved at corners thereof. Reference numerals 110 indicate guide rollers provided in the above-mentioned corners to guide the shield members 307 between the guide grooves 109 and the guide rollers 110 in a curved manner.

Figure 15:
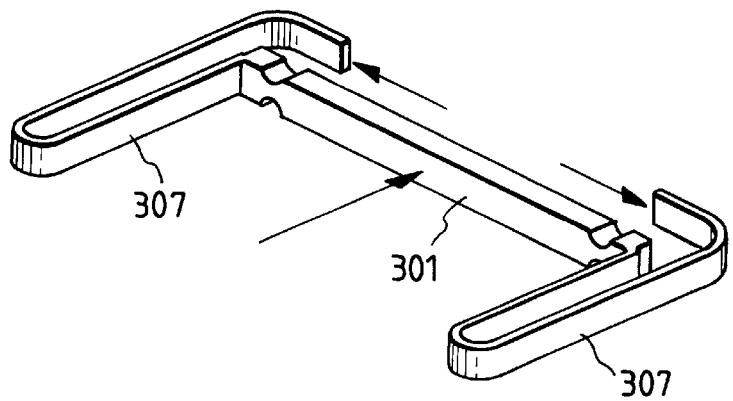
FIG. 15 is a perspective view illustrating a constitution of a shield member of the portable IC card reader of FIG. 14.

Referring to FIG. 15, in the third embodiment, when the IC card 200 is inserted at the IC card insert port 102 of the IC card reader 100, the first lid member 301 is pressed back (in the direction of long arrow) to pull the shield members 307 to both sides (in the directions of short arrows), thereby opening a second opening 122 for ejecting foreign matters.

When the IC card 200 is taken from the IC card accommodating unit 104 at the IC card insert port 102, the first lid member 301 is returned to its home position by the force of springs 300 (FIG. 14) to push the shield members 307, closing the foreign-matter ejection exit 122.

Figure 16:
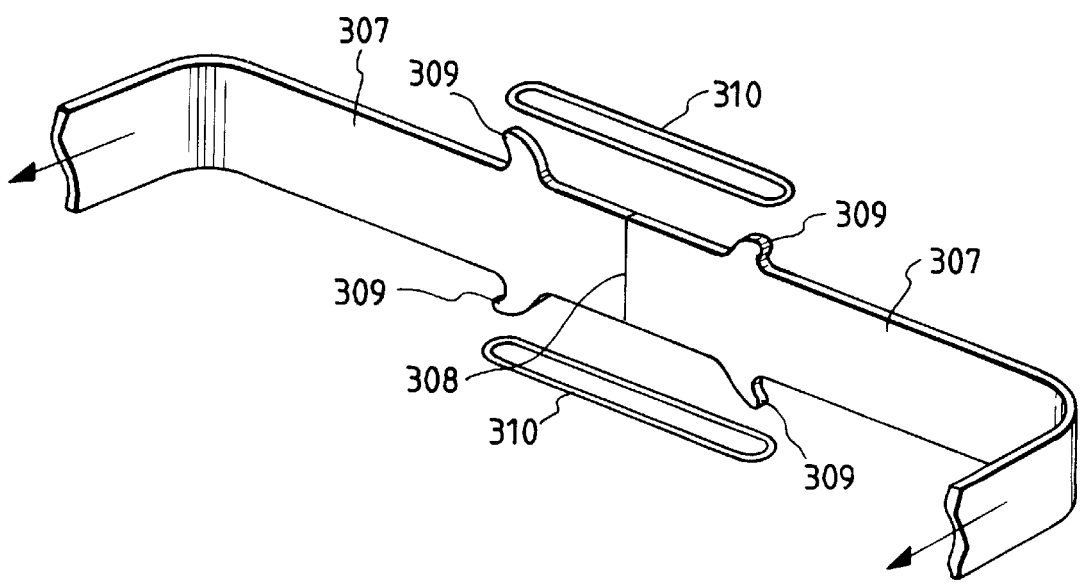
FIG. 16 is a perspective view of a variation of the shield member of the portable IC card reader of FIG. 15.

Referring to FIG. 16, there is shown a variation to the third embodiment. In this variation, the springs 300 are replaced with another mechanism. Namely, the shield members 307 are formed with hooks 309 at abutting ends. Pairs of opposite hooks 309 are connected with rubber bands 310. Thus, when the IC card 200 is inserted from the IC card insert port 102 of the IC card reader 100, the shield members 307 are pulled to both sides to open the foreign-matter ejection exit 122, stretching the rubber bands 310. When the IC card 200 is removed, the shield members 307 are returned to the home positions by the force of the rubber bands 310 to close the foreign-matter ejection exit 122.

As described and according to the present invention, foreign matters that have penetrated an IC card accommodating unit of an IC card reader mainly during carrying of the IC card reader in a clothes pocket, a bag or the like, are ejected by the insertion of an IC card and, at the same time, the inside of the IC card reader is cleaned to ensure good contact between the inserted IC card and the IC card reader, thereby providing the easy-to-carry and reliable IC card reader.

While the preferred embodiments of the present invention have been described using specific terms, such description is for illustrative purposes only, and it is to be understood that changes and variations may be made without departing from the spirit or scope of the appended claims.

What is claimed is:

1. A portable integrated-circuit card reader for displaying data stored in an integrated-circuit card, comprising a housing having a first opening and a second opening, said housing delimiting a substantially enclosed interior space in which an integrated-circuit card is loaded into said space by insertion through said first opening, said second opening being an opening through which said integrated-circuit card cannot be inserted, said second opening being connected to said first opening via said space, said space having a construction for accommodating said integrated-circuit card, said first opening and said second opening each having a narrow slot-like configuration.

2. A portable integrated-circuit card reader for displaying data stored in an integrated-circuit card, comprising a housing having two openings, said housing delimiting a substantially enclosed interior space in which an integrated-circuit card is loaded into said space by insertion through respective ones of the two openings, one of the two openings being connected to an other of the two openings via said space so that when said integrated-circuit card is inserted through the one of the two openings foreign-matter is discharged from the other of the two openings, said space having a construction for accommodating said integrated-circuit card.

3. A portable integrated-circuit card reader for displaying data stored in an integrated-circuit card, comprising a space in which an integrated-circuit card is loaded, said space having first and second openings through which said integrated-circuit card can be inserted, one of said first and second openings being connected to the other of said first and second openings, said space having a third opening connected to said first and second openings so that when said integrated-circuit card is inserted from one of said first and second openings, foreign-matter is discharged from said third opening, said space having a construction for accommodating said integrated-circuit card.

4. A portable integrated-circuit card reader according to claim 1, wherein said first and second openings are arranged at opposite sides of said housing and in the same plane.

5. A portable integrated-circuit card reader according to claim 1, wherein said first opening is disposed at one side of the housing and said second opening is disposed orthogonally with respect to said first opening at a bottom portion of said housing, said second opening being disposed for discharge of foreign-matter therethrough.

6. A portable integrated-circuit card reader according to claim 1, wherein the narrow slot-like configuration of said first opening and said second opening have an appearance suitable for insertion of said integrated-circuit card, said first opening being configured to enable said integrated-circuit card to be inserted therethrough and said second opening being configured to prevent insertion of said integrated-circuit card therethrough.

7. A portable integrated-circuit card reader according to claim 2, wherein said two openings are arranged at opposite sides of said housing and in the same plane.

8. A portable integrated-circuit card reader according to claim 2, wherein one of the two first openings is disposed at one side of the housing and said other of the two openings is disposed orthogonally with respect to said one of the two openings at a bottom portion of said housing, said other of the two openings being disposed for discharge of foreign-matter therethrough.

9. A portable integrated-circuit card reader according to claim 2, wherein the two openings have a narrow slot-like configuration providing an appearance suitable for insertion of said integrated-circuit card, said one of the two openings being configured to enable said integrated-circuit card to be inserted therethrough and said other of the two openings being configured to prevent insertion of said integrated-circuit card therethrough.

* * * * *